United States Patent
Shahar et al.

(10) Patent No.: US 6,285,029 B1
(45) Date of Patent: Sep. 4, 2001

(54) SEMICONDUCTOR GAMMA-RAY DETECTOR

(75) Inventors: Arie Shahar, Moshav Magshimim; Uri El-Hanany, Rehovot; Alex Tsigelman, Petach Tikva; Shimon Klier, Savion; Eldan Halberthal, Moshav Beit-Zait, all of (IL)

(73) Assignee: Imarad Imaging Systems Ltd., Rehovot (IL)

( * ) Notice: Subject to any disclaimer, the term of this patent is extended or adjusted under 35 U.S.C. 154(b) by 0 days.

(21) Appl. No.: 09/123,754

(22) Filed: Jul. 27, 1998

(51) Int. Cl.[7] .................................................. G01T 1/24
(52) U.S. Cl. .................................. 250/370.14; 250/370.1
(58) Field of Search ........................... 250/370.14, 370.1

(56) References Cited

U.S. PATENT DOCUMENTS

| | | |
|---|---|---|
| 3,011,057 | 11/1961 | Anger . |
| 4,857,737 | 8/1989 | Kamae et al. . |
| 4,891,522 * | 1/1990 | Coon et al. ........................ 250/370.1 |
| 4,926,052 * | 5/1990 | Hatayama et al. ............... 250/370.14 |

OTHER PUBLICATIONS

H.H. Barrett et al. "Charge Transport in Arrays of Semiconductor Gamma–Ray Detectors", published in Physical Review Letters, vol. 75, pp. 156–159, 1995.

A. Zych et al. "Few Arc Minute and Kev Resolution with the Tiger Compton Telescope", published in Proceedings of 2nd Integral Workshop "The Transparent Universe", St. Malo, France, Sep. 16–20, 1996. ESA SP–382 (Mar. 1997).

J–F. Gigot et al., "Modelling By an Analytical Function of a Pixellized CdTe Photoconductor Response", Nuclear Instruments and Methods in Physics Research A 380 (1996), pp. 479–482.

Jean–Louis Gerstenmayer et al., "Pixellized CdTe MeV-–Camera for Flash Radiography", Nuclear Instruments and Methods in Physics Research A380 (1996), pp. 462–466.

* cited by examiner

Primary Examiner—Constantine Hannaher
Assistant Examiner—Otilia Gabor
(74) Attorney, Agent, or Firm—Darby & Darby

(57) ABSTRACT

A novel semiconductor detector device, consisting of several layers of two dimensional detector modules each module being divided into an array of separate detector cells by means of the pixelation of the electrodes on the surfaces of the modules. The superimposed detector cells in equivalent positions in each layer are in electrical contact with those in the two immediately adjacent layers, such that the whole device effectively becomes a two dimensional array of stacks of individual detector cells, with a common bottom electrode. Current in each detector cell stack, induced by the absorption of a high energy photon in that stack, is measured by means of an integrating charge sensitive amplifier attached to each anode at the top of each cell stack. A large area gamma-ray detector, sufficiently thick to absorb the high energy photons arising from electron-positron annihilation events, is thus obtained, but without the expense associated with the production of a single detector crystal of the required thickness.

17 Claims, 4 Drawing Sheets

SEMICONDUCTOR GAMMA-RAY DETECTOR

FIELD OF THE INVENTION

The present invention relates generally to semiconductor gamma-ray detectors, and especially to arrays of such detectors for high-energy gamma-ray imaging.

BACKGROUND OF THE INVENTION

The method of annihilation detection coincidence (ADC) is a very attractive detection technique in the field of nuclear imaging for medical purposes. This method makes use of he physical principle of electron-positron annihilation, which produces a pair of high-energy (511 Kev) photons. These photons propagate along a common line but in opposite directions. A two-headed gamma-ray camera is used to detect the locations where the photon-pair absorbed. An image reconstruction is accomplished by determining the liens along which the photons propagate from their point of production to their point of absorption. In order to reject scattered photons or stray photons not related to the pair being recorded, which if counted would produce a distorted or incorrect image, the energy of the photons and their timing (coincidence) is also measured. Since the method does not require a collimator, it is known as a collimator less method or a method of electronic collimation. Instruments designed according to this method have the advantages of improved sensitivity and of much reduced weight.

Imaging technologies based on Positron Emission Tomography (PET) that include multiple detectors and PET-like cameras having two detector-heads, require the use of detectors with high stopping power. The high stopping power is needed for efficient absorption of the high-energy photons. High stopping power is achieved by using thick detectors made of materials having a high atomic number, Z.

The traditional gamma-ray imaging technology presently used in nuclear medicine, including PET-like machines, uses Anger cameras, such as the type described in U.S. Pat. No. 3,011,057 to Anger. In this technology, the detectors are made of thick scintillators (such as sodium iodide NaI) combined with photo-multipliers. The more recently introduced semiconductor radiation detectors, such as those made of CdTe and CdZnTe, have the advantages of improved performance over scintillation detectors, in terms of improved energy and spatial resolution, count rate, stopping power and compactness. Accordingly such detectors have great potential to replace the traditional current technology of the Anger camera.

The idea of using a pixelated imaging-plane detector, consisting of multiple cells of semiconductor detector arrays is known in the art, as for instance described by H. H. Barrett, J. D. Eskin and H. B. Barber in their article "Charge transport in arrays of semiconductor gamma-ray detectors", published in Physical Review Letters, Vol. 75, pp. 156–159, 1995. Until recently, the very low yield associated with the growth of high quality semiconductor crystals, meant that the manufacturing process was costly and time consuming, which caused the above-mentioned idea to be unsuitable for implementation on a commercial basis.

Recent advances in crystal growth technology has improved the yield, enabling the production of relatively large modular pixelated detector arrays, which can be combined to form the complete imaging plane for gamma-ray and X-ray cameras. The current yield enables the economic production of pixelated detector arrays with typical module sizes of about 20×20 mm at the electrode surfaces, and several millimeters thick. Such relatively large modules of detectors have provided the commercial justification for the production of semiconductor gamma and X-ray cameras.

However, because the thickness of these detectors is limited to several millimeters, such cameras are suitable only or use in the energy range between X-ray and medium energy gamma-rays. In order to make such cameras suitable for proper operation with the method ADC, the thickness of the detectors must be increased to provide the high stopping power needed for high-energy photons (511 Kev). However, since such detectors would have higher volume, they would also have higher levels of grain boundaries, defects, traps and included non-uniformity in electric field, all of which degrade detector performance. The manufacturing yield thus goes down with the detector volume.

If the probability for producing a good module having a specific area of pixelated electrodes and of thickness d, is P, then the probability p of producing a good module having the same area, but of thickenss D, is given by:

$$p = p^{(D/d)} \tag{1}$$

This means that increasing the detector thickness for use with high-energy photons, while maintaining the same surface area, causes a significant reduction in the probability P of producing a good detector module. Alternatively, the same probability P of producing a good thick detector module would mean the reduction of the surface area of the detector modules, resulting in an area which is impractical for use.

There therefore exists a serious need for a detector module having a thickness with stopping power sufficient for use with high-energy photons, but which can be produced at a yield similar to that of thinner detector modules of similar detection area.

The disclosures of all publications and patents mentioned in this section, and in the other sections of the specification, and the disclosures of all documents cited in the above publications, are hereby incorporated by reference.

SUMMARY OF THE INVENTION

The present invention seeks to provide a new semiconductor high-energy gamma-ray detector module, capable of being manufactured with a high process yield, which overcomes the drawbacks and disadvantages of existing semiconductor detector modules.

There is thus provided in accordance with a preferred embodiment of the present invention, a novel semiconductor detector device, consisting of several years layers of two dimensional detector modules, each module being divided into an array of separate pixelated detector cells, by means of the pixelation of the electrodes on the surfaces of the modules. The bottom surface electrode is generally left continuous and serves as a common electrode to all of the detector cells in the two dimensional array. The superimposed detector cells in equivalent positions in each layer are joined electrically to those in the two immediately adjacent layers by means of good Ohmic contact. In this way, the whole device effectively becomes a two dimensional array of stacks of individual detector cells, with a common bottom electrode. The bottom electrode is generally made the cathode, b the application of a negative bias voltage. Current in each detector cell stack, induced by the absorption of a high energy photon in that stack, is measured by means of an integrating charge sensitive amplifier attached to each anode at the top of each cell stack.

A primary advantage of the detector device, constructed and operative according to the present invention, is that it becomes possible to obtain a large area gamma-ray detector, sufficiently thick to absorb the high energy photons arising from electron-position annihilation events, but without the very high expense associated with the production of a single detector crystal of the required thickness.

According to a further preferred embodiment of the present invention, the performance of the detector device can be improved by the use of a "nail head like structure" for the contact electrodes, which conduct the current into and out of each semiconductor detector. This structure is achieved by depositing an insulating layer on the detector surface, before deposition of the electrode layer. The insulating layer has holes at the center of each detector cell, and the electrodes thus make contact with the detector only through the limited area of the holes.

According to yet another preferred embodiment of the present invention, it is possible to provide a larger area detector device, for use, for instance, in medical imaging applications, by building up a two dimensional array of devices from individual modules constructed according to the present invention.

In accordance with yet another preferred embodiment of the present invention, there is provided a gamma-ray detector device consisting of a plurality of gamma-ray detectors, each consisting of a two-dimensional array of detector cells, the gamma-ray detectors being superposed such that detector cells in each array are positioned substantially one on top of the other, and such that the detector cells positioned substantially one on top of the other are in electrical contact, such that current can flow between the detector cells positioned substantially one on top of the other, the gamma-ray detector device being of thickness sufficient to effectively absorb gamma-ray photons having energies typical of those typical of those arising from electron-positron annihilation events.

In accordance with a further preferred embodiment of the present invention, there is also provided a gamma-ray detector device as described above, and wherein the photons have energies typically less than those arising from electron-positron annihilation events.

In accordance with still another preferred embodiment of the present invention, there is provided a gamma-ray detector device as described above, and also consisting of a device for measuring the current flowing through the detector cells positioned substantially one on top of the other, an example of such a device being a circuit including a charge sensitive amplifier.

There is further provided in accordance with yet another preferred embodiment of the present invention, a gamma-ray detector device consisting of a plurality of two dimensional gamma-ray detectors in the form of layers superposed on each other, each layer of gamma-ray detectors having a first and second surface with electrodes on the surfaces, and wherein the electrode on at least second of the first and second surfaces of the first layer of gamma-ray detectors is pixelated, thereby forming a two dimensional array of detector cells on the first layer, and wherein the electrodes on both first and second surfaces of the other layers of gamma-ray detectors are pixelated, thereby forming two dimensional arrays of detector cells on the other layers; and wherein the other layers of gamma-ray detectors are superposed such that he pixelated electrodes thereon are substantially aligned with the pixelated electrodes on the second surface of the first layer of gamma-ray detectors, and wherein the substantially aligned pixelated electrodes on adjacent layers are in electrical contact, such that current can flow between the electrode on the first surface of the first layer of gamma-ray detectors, and between the substantially aligned pixelated electrode on second surface of the last of the layers of gamma-ray detectors, through all superposed pixelated electrodes, the gamma-ray measurement device being of thickness sufficient to effectively absorb gamma-ray photons having energies typical of those arising from electron-positron annihilation events.

There is further provided in accordance with still another preferred embodiment of the present invention, a gamma-ray detector device as described previously, and wherein the photons have energies typically less than those arising from electron-positron annihilation events.

Furthermore, in accordance with yet another preferred embodiment of the present invention, there is provided a gamma-ray detector device as above, and also including a device for measuring current, such as a circuit including a charge sensitive amplifier, connected to at least one of the substantially aligned pixelated electrodes on the second surface of the last layer of gamma-ray detectors, operative to measure the current flowing between the pixelated electrode and the electrode on the first surface of the first layer of gamma-ray detectors.

There is even further provided in accordance with a preferred embodiment of the present invention, a gamma-ray detector device as described hereinabove, and wherein the electrode on the first surface of the first layer of gamma-ray detectors has a voltage applied thereto, of polarity such that it acts as a cathode relative to the pixelated electrodes on the second surface of the last layer of gamma-ray detectors.

There is also provided in accordance with a further preferred embodiment of the present invention, a gamma-ray detector device as above, and wherein the electrode on the first surface of the first layer of gamma-ray detectors has a voltage applied thereto, of polarity such that it acts as an anode relative to the pixelated electrodes on the second surface of the last layer of gamma-ray detectors.

In accordance with further preferred embodiments of the present invention, there is provided a gamma-ray detector device according to any of the above descriptions, and wherein the gamma-ray detectors are made of cadmium telluride or cadmium zinc telluride.

In accordance with still more preferred embodiments of the present invention, thee is provided a gamma-ray detector array consisting of a two dimensional array of gamma-ray detector devices according to any of the above descriptions.

There is further provided in accordance with et another preferred embodiment of the present invention, a gamma-ray detector device as described hereinabove, and wherein an insulating layer having a periodic array of openings is formed between the surface of the gamma ray detector and the pixelated electrodes, such that the pixelated electrodes contact the gamma-ray detector only through the openings, the pixelated electrodes being located relative to the openings such that the openings fall in the vicinity of the center of the pixelated electrodes.

BRIEF DESCRIPTION OF THE DRAWINGS

The present invention will be understood and appreciated more fully from the following detailed description, taken in conjunction with the drawings in which:

FIG. 1(a) shows the selection procedure, and FIG. 1(b) a good module obtained after the selection and dicing procedure.

FIG. 2(a) schematically shows a novel detector stack constructed according to a preferred embodiment of the present invention, while

DETAILED DESCRIPTION OF PREFERRED EMBODIMENTS

Figure 1A:
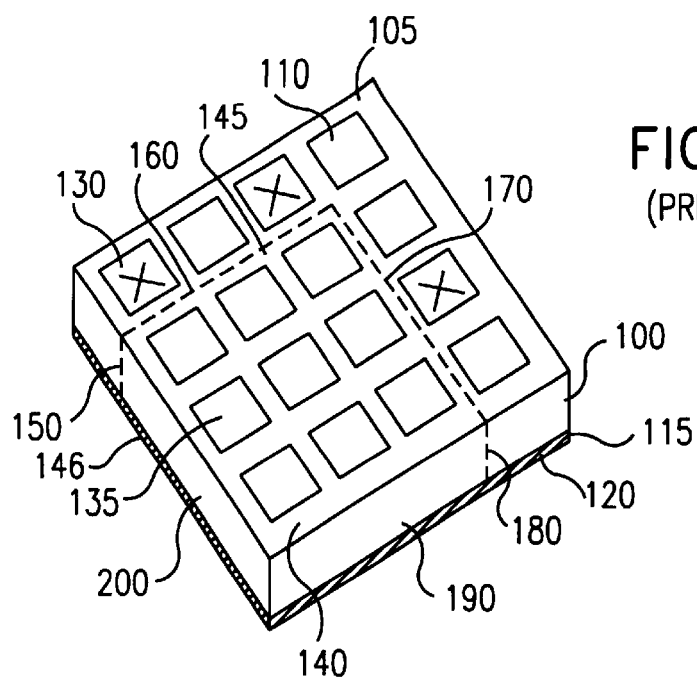
FIGS. 1(a) and 1(b) schematically show the prior art method used to select and dice good modules out of a larger wafer.
Figure 1B:
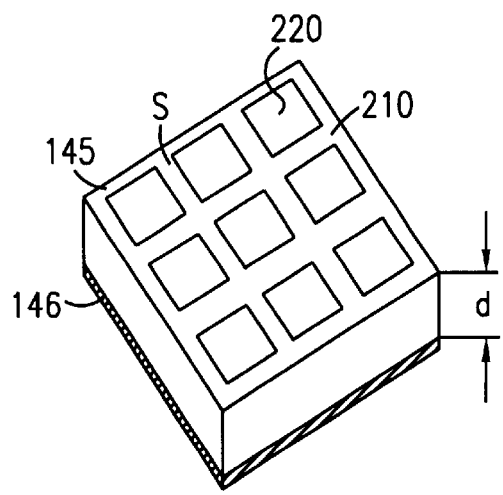

Reference is now made to FIGS. 1(a) and 1(b), which illustrate schematically the prior art selection and dicing process used to fabricate a good detector module out of a larger wafer including suitable unsuitable areas. Though this procedure is well known, it is used in the first stages of the production of the detector module according to the present invention, and so is described herein order to assist in understanding the present invention.

FIG. 1(a) shows a polished wafer 100 sliced from a semiconductor crystal boule such as CdTe or CdZnTe and having pixelated electrodes 110 on its upper surface area 105 and a continuous monolithic electrode 115 on its lower surface area 120. Generally, the upper pixelated electrodes 110 are used as the anodes, and the continuous lower electrode 110 as the cathode, and the detector operation will be described as such hereinafter. Wafer 100 is tested to evaluate the performances of each of its detector cells, each cell being defined by means of its pixelated anode 110. The object of the selection procedure is to obtain from the complete wafer, a detector module containing only cells having "good" detection performance, as determined by certain predefined specifications. The cells, such as that with anode 130, which are rejected due to their poor performance, are marked with a sign X. The volume chosen for producing a good detector module contains only good cells which are unmarked, such as that with anode 135. An example of such a volume 140 is bounded by the upper and lower surface areas 145 and 146, by the broken lines 150, 160, 170 and 180, which represent the dicing surfaces, and by the wafer edges 190 and 200.

FIG. 1(b) shows a detector module 210 produced by dicing the volume labeled as 140 out of the wafer 100 shown in FIG. 1(a). All the cells of detector module 210 with anodes such as anode 220 are good, i.e. have performance with the predefined specifications.

The yield per wafer is defined in terms of the probability P of being able to dice out of the wafer 100, good modules such as detector module 210 within the bounds of the doted dicing lines, having an upper or lower area S, 145 or 146, and thickness d. The probability P, is defined as the ratio between the sum of the areas S, divided by the total area A of wafer 100. Accordingly P is given by:

$$P = nS/A \qquad (2)$$

when n is then umber of good detector modules that can be produced from the wafer.

Figure 2A:
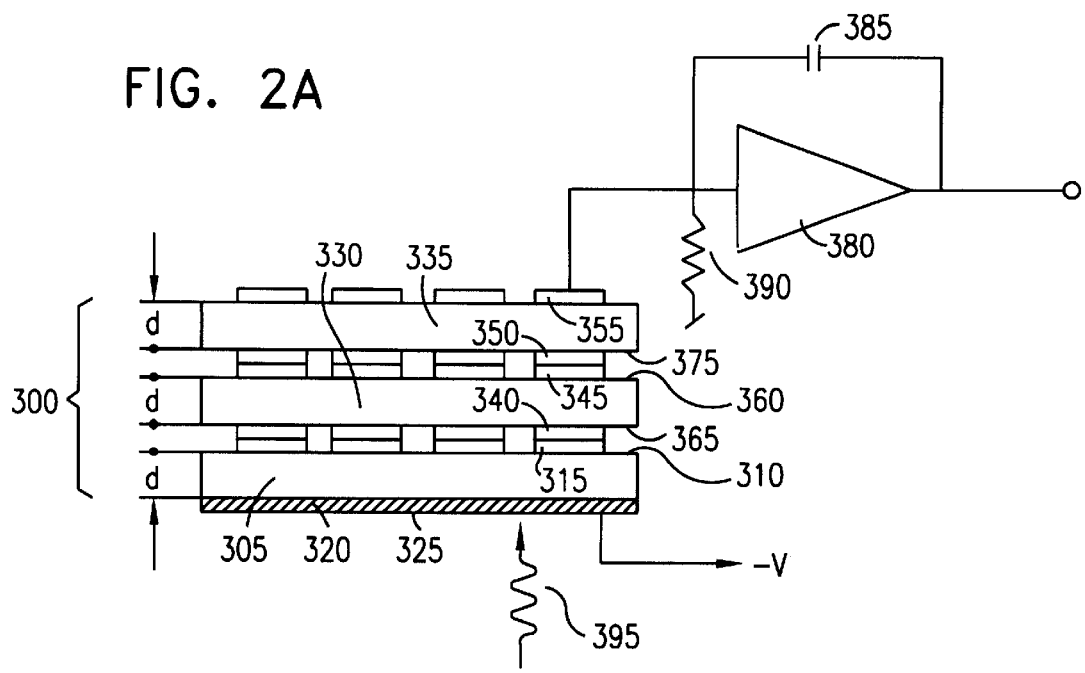
Figure 2B:
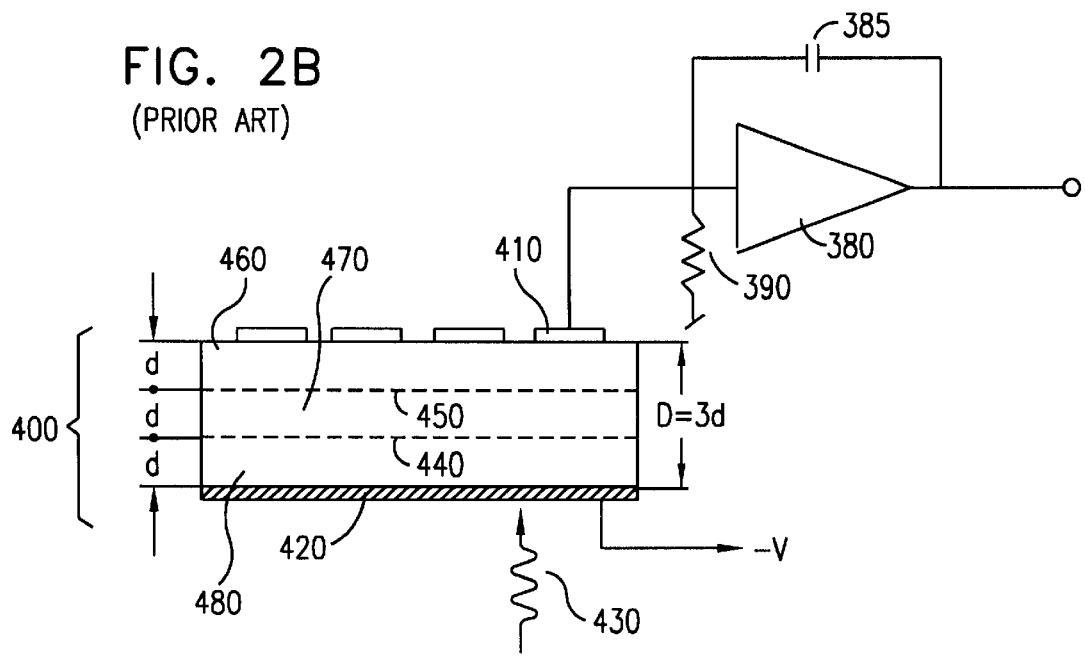
FIG. 2(b) shows, for comparison purposes, a conventional prior art detector having the same thickness.

Reference is now made to FIG. 2(a), which is a schematic illustration of a thick detector module assembly, constructed and operative according to a preferred embodiment of the present invention. FIG. 2 (b) shows a prior art conventional detector module having a thickness equal to the total thickness of the detector module shown in FIG. 2(a). FIG. 2(b) is brought for comparison purposes, to explain the advantages of the detector module according to the present invention, as shown in FIG. 2(a).

The detector module assembly 300 shown in FIG. 2(a) is produced from a stack of three individual semiconductor detector modules 305, 330 and 335, constructed of materials such as CdTe or CdZnTe, which are combined one on the top of the other. While in the specific example shown in FIG. 2(a), a stack of three detector modules is used in the complete assembly, it is clear that there is no limitation to the number of detector modules that can be used in the stack. Lower modules 305 has an upper surface 310 with pixelated electrodes 315 serving as anodes, and a lower surface 320 with a continuous monolithic electrode 325, serving as cathode. All of the other detector modules 330 and 335 have pixelated electrodes both on their both upper and lower surfaces, such as electrodes 340 ad 345 on upper and lower sides 360 and 365 respectively of module 330 and electrodes 350 and 355 on upper and lower sides 370 and 375 respectively of module 335. Pixelated electrodes such as electrodes 315, 345 and 355 locates on upper surfaces 310, 360 and 370 of modules 305, 330 and 335 respectively serve as the anode electrodes of their related modules. Except for lower detector module 305, which has a continuous monolithic cathode electrode, the other detector modules 330 and 335 have pixelated electrodes such as electrodes 340 and 350 on their lower sides 365 and 375 respectively, which serve as the cathode electrodes of their related modules.

The upper pixelated anodes, such as 315 and 345 on surfaces 310 and 360 of modules 305 and 330 respectively, are disposed immediately opposite the lower pixelated cathodes, such as 340 and 350 on surfaces 365 and 375 of modules 330 and 335 respectively, and are electrically connected thereto. The electrical connection can be achieved by gluing or bonding the contact pads of the electrodes using conductive adhesive. This electrical connection can also be executed by any other suitable process, such as by soldering or by pressure contact by means of soft metal bumps, such as Indium bumps. The anodes 355 on upper surface 370 of upper module 335 are positively biased relative to the monolithic cathode 325 of the lower module 305. The signals from these anodes are electrically inputted to Charge Sensitive pre-Amplifiers (CSA), such as CSA 380, CSA 380 has an integration capacitor 385 and a bias resistor 390 that allows it to be used in a DC-coupled mode. The output from all of the CSA's 390 is processed by the imaging system to produce the desired image. Detector 300 is constructed of a stack of three detector modules, each of thickness d, and thus has an effective thickness of 3d. Radiation, represented by photon 395 propagating towards detector 300, is absorbed anywhere within the total thickness 3d of the detector stack.

The process of stacking detector modules to produce a good detector stack is in itself very reliable and the failure rate of this process is negligible. Accordingly, if the yield for fabricating a single detector module is P, then the yield for fabricating the complete detector stack is also substantially P, no matter how many detector modules are incorporated in the stack. This means that a detector module assembly constructed and operative according to this embodiment of the present invention, as shown in FIG. 2(a), allows any desired stopping power to be achieved, simply by increasing the number of individual modules in the stack, thus increasing the effective thickness. At the same time, the production yield of such a detector stack is substantially no worse than the yield of one of the single detector modules used in its construction.

FIG. 2(b) is an illustration of a prior art conventional semiconductor detector module 400 made from materials such as CdTe or CdZnTe, and having the same total thickness, D=3d, as the stacked detector module assembly illustrated in FIG. 2(a). The detector module has upper pixelated anodes 410 and a lower continuous monolithic cathode 420. Each of anodes 410 is positively biased relative to cathode 420 and is connected to a CSA 380 have an integration capacitor 385 and a biasing resistor 390 for providing DC-coupled operation. Incident radiation, such as that represented by photon 430, is absorbed in the volume of the detector module.

In order to compare the detector of FIG. 2(a), constructed and operative according to the present invention, and the conventional prior art detector shown in FIG. 2(b), the detector 400 of FIG. 2(b) is divided by virtual planes 440 and 450 into three individual virtual detector layers 460, 470 and 480, each of thickness d. When cathode 420 has the same area S, as cathode 325 of FIG. 2(a), each of te virtual 460, 470 and 480 has the same volume V as each of the corresponding detector modules 305, 330 and 335 of FIG. 2(a). Since the yield is related to the volume of the crystal, it is clear that if the yield equals P for each of the detector modules of FIG. 2(a), then the yield of having a good virtual layer in FIG. 2(b) is also P. The probability that the whole of detector 400 be good then equals the probability that virtual layer 460 and virtual layer 470 and virtual layer 480 will all be good. This probability, p, is given by:

$$p=P^{(D/d)} \quad (3)$$

As an example, a detector module of size 20×20 mm, and 4 mm thick has a production yield rate of about 30%. For high-energy (511 Kev) gamma detectors, a thickness of about 12 mm is needed to provide sufficient stopping power. The yield rate for producing such a detector by the conventional method is thus $(0.3)^3=2.7\%$, which is not commercially viable. If, on the other hand, a 12 mm thick detector module is constructed according to the present invention, the yield rate remains about 30%, making the detector module commercially viable.

Figure 3:
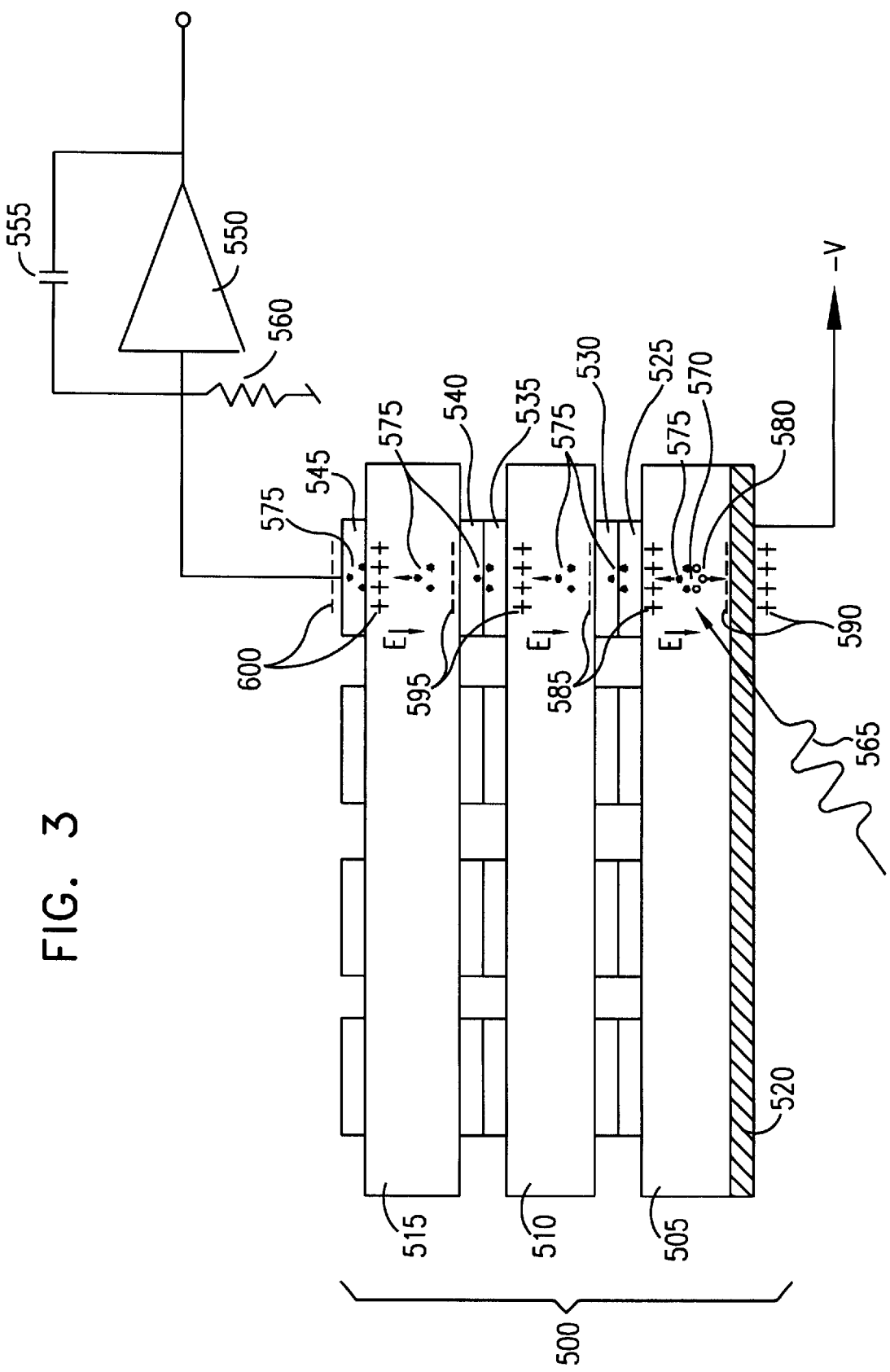
FIG. 3 is another schematic illustration of the detector stack shown in FIG. 2(a), demonstrating the operation principle of the detector in terms of the charge motion therein.

FIG. 3 shows a detector stack 500 similar to that shown in FIG. 2(a), constructed and operative according to a preferred embodiment of the present invention. FIG. 3 particularly illustrates the mode of operation of the detector. The detector stack includes three detector modules 505, 510 and 515, one on top of the other. Lower module 505 has a continuous monolithic cathode 520 on its lower side and pixelated anodes 525 on its upper side. The anodes 525 face, and are electrically connected to, cathodes 530 on the lower side of detector module 510. Similarly, anodes 535 and cathodes 540 face each other and are electrically connected in the interface between detector modules 510 and 515. Each of the nodes 545 is connected to the input of a CSA 550 having an integration capacitor 555 and a biasing resistor 560.

Cathode 520 is negatively biased at a voltage −V, and this bias voltage is distributed across modules 505, 510 and 515 in accordance with their resistance. If the resistance of each module is uniform then the anodes of each pixel have approximately the same potential, thus giving the same collection efficiency for each anode. The bias on each of detectors modules 505, 510 and 515 and the equal potential of the anodes of each of these modules produces a uniform electrical field E inside the volume of each module. This is represented by an arrow E pointing toward the cathode of each module. When a photon 565 is absorbed, for example, in the lower module 505, it creates a cloud 570 of electron-hole pairs. Under the influence of electrical field E, the electrons and holes separate to form an electron cloud 575, having negative electrostatic charge, and a hole cloud 580, having positive electrostatic charge. The electron cloud 575 drifts up against the direction or field E, and the hole cloud 580 drifts down in the direction of the field E.

At any point in time, these charge clouds 575 and 580 induce electrostatic charge on electrodes 520 and 525 of detector module 505. The charge 585 on electrode 525 and charge 590 on electrode 520 have polarities of opposite sign to that of the clouds that produce that charge. The charge 585 appears on both anode 525 of module 505 and cathode 530 of module 510, as they are electrically connected. The charge 585 on electrode 530 induces charge 595 on electrodes 535 and 540, which likewise induce charge 600 and anode 545. The charges 585 and 590 are respectively proportional to the instantaneous solid angle subtended between electrode 520 andcloud 580, and that between electrode 525 and cloud 575. As the charge clouds 575 and 580 drift, they subtend a constantly changing solid angle with their respective destination electrodes along the course of their drift path. Accordingly, the total charge Q induced by clouds 575 and 580, as they drift between electrodes 520 and 575, is time dependent, and can be expressed as Q(t). The displacement current $I_D$ is equal to the time derivative of Q(t) and is given in a mathematical form by:

$$I_D=dQ(t)/dt \quad (4)$$

The solid angle subtended between the charge carriers of cloud 580 and electrode 520 is large, and hence almost unchanged over the whole of the drift path of cloud 580. Consequently, the amount of charge, Q(t), induced per unit time, on the electrode 520 during its drift, is almost constant, and the displacement current $I_D$ is thus also almost constant.

If the effects of trapping and recombination between electrons and holes are ignored, clouds 575 and 580 are collected by electrodes 525 and 520 respectively and the induced charge Q at those electrodes is equal to the total charge of clouds 575 and 580. When cloud 575 is collected by electrodes 525 and 530 at the interface between modules 505 and 510, it causes a perturbation of the otherwise neutral electric charge in these electrodes. This perturbation, under the influence of the electric field E in the detector module 510, causes the cathode 530 in inject charge cloud 575 into the crystal volume of module 510. This cloud is module 510 is now in a situation similar to the situation when cloud 575 was created in module 505. Therefore, cloud 575 repeats the process and produces a displacement current $I_D$ until it reaches electrodes 535 and 540. The process is then again repeated in module 515, producing a displacement current $I_D$ until the charge cloud 575 reaches anode 545. The total charge Q developed on capacitor 555, equals the integration of displacement current $I_D$ over the total transit time of clouds 575 and 580. This integration time starts with the creation of clouds 575 and 580 in module 505, and ends when they reach anode 545 and cathode 520, respectively. Charge Q equals the total charge of clouds 575 and 580, and is the same charge that would be measured by a conventional prior art detector having a thickness equal to the total thickness of detector modules 505, 510 and 515. The charge production mechanism shown in FIG. 3 has been explained in terms of a photon being absorbed in the lower module 505, but it is clear that when the absorption site is in any of the other detector modules, the operational principle is similar. The only difference is that he motion of charge cloud through the various modules will then need to be described also in terms of the hole cloud 580 moving downward towards the cathodes, and not only in terms of the electron cloud 575 moving upwards towards the anodes.

Multiplayer detectors are known in the art, such as those descried in U.S. Pat. No. 4,857,737 to T. Kamse and R. Enomoto, and the article by A. Zych et. al. entitled "Few are minute and Kev resolution with the TIGER Compton telescope", published in Proceedings of $2^{nd}$ INTEGRAL workshop "The transparent Universe", St. Malo, France, 1614 20 September 1996, ESA SP-382 (March 1997). Those prior art detectors differ, however, from the detector stack of the present invention, both in their physical structure and in their functionality, as described hereinbelow.

In terms of their physical structure, the multilayer detectors described in the prior art have a separate readout for each cell at each layer, and the various layers are unconnected electrically. In U.S. Pat. No. 4,857,737, for instance, the gap between superposed detector layers is stated as being from 1 mm. to 2 cm. The detector stacks according to the present invention, on the other hand, are made from modules having cells, which are electrically connected one on the top of the other to form columns of multi-cells. Each column of cells has only a single readout for detecting radiation absorbed anywhere in that column.

In terms of their functionality, the prior art multilayer detectors descried in the above mentioned references are for use in a Compton telescope for collimatorless imaging. Such detectors must provide information about the X-, Y- and Z-coordinates of the interaction sites where the absorption or scattering of photons occurs. In order to reconstruct the image of the measured object, this information must be provided for each event of a sequence of multiple events, thus determining the orientation direction of the absorbed photons. The multiple events occur simultaneously in a chain of at least two events, where the last event is a photoelectric absorption and all the other previous events are Compton-scattering events. Consequently, in order to provide simultaneously the coordinates of each of the simultaneous events in the event chain, these detectors must have separate readouts for each cell at each layer. Furthermore, in order to provide an accurate, high resolution measurement of the Z-coordinate, the detectors layers must be thin, resulting in low stopping power of each detector layer.

Unlike those prior-art detectors, the detectors of the present invention are designed to have high-stopping power, for use in "Single Photon Counting" methods in the high-energy range. In this case no information is provided about the Z-coordinate of the event, and thus there is no separate readout for each layer in the detector stack. All the cells that are piled up in a column act as a single thick cell with high stopping power and share a common readout for reading a single event at a time. If more than one event occurs simultaneously, the information is rejected due to pileup rejection.

In summary, the detectors of the present invention enable high-yield production of detectors having high stopping-power, while prior-art multilayer detectors provide information for reconstructing a Compton telescope image, and have low stopping power for each detector layer.

From the operational description of the embodiment shown in FIG. 3, it is clear that the electrodes at the interfaces between the modules must have good Ohmic contacts to allow free injection or emission of the electron and hole clouds, from the electrodes at which these clouds were collected, into the crystal volume of the next module. If the Ohmic contacts are not good, an energy barrier exists between the contacts and semiconductor crystal. Such an energy barrier disturbs the injection of electrons and holes from the electrodes at the interface between modules into the volume of the next module. This prevents free transition of charge carriers in the detector, resulting in incomplete charge collection and consequent performance degradation.

Figure 4:
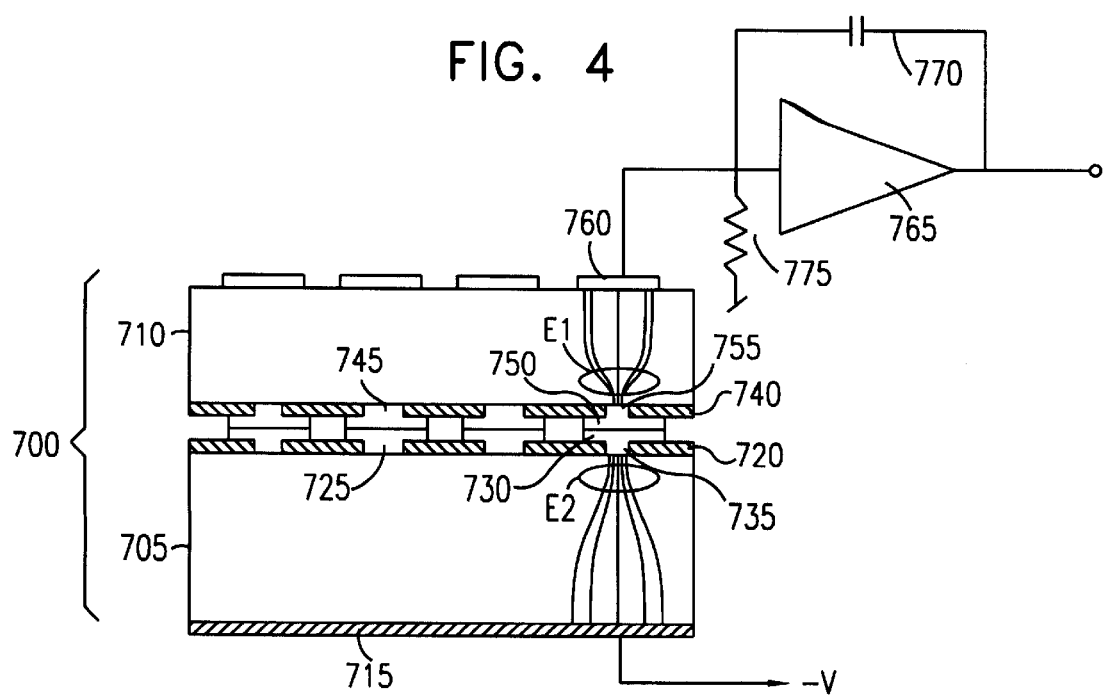
FIG. 4 is a schematic illustration of a detector according to another preferred embodiment of the present invention, having an improved contact structure in the interfaces between adjacent modules.

FIG. 4 illustrates a further preferred embodiment of the present invention, which has an improved contact structure for allowing efficient operation of the detector even when the Ohmic contacts of the electrodes at the interfaces between modules is not perfect. To explain the mechanism of this embodiment, the detector 700 shown in FIG. 4 includes only two detectors modules 705 and 710, but the principle is applicable to any number. Lower module 705 has a continuous monolithic cathode 715 on its lower side. The upper side of module 705 is coated with an electrical insulating layer 720, with multiple small openings 725. Metal contacts 730 are applied on top of insulating layer 720, above the openings 725 to form contacts with a "nail head like structure". These have small contact areas 735 with the semiconductor crystal and a bigger pad area on top of insulating layer 720. The lower side of module 710 has an insulating layer 740, openings 745, contacts 750 and small area openings 755, completely analogous to those on the upper side of module 705.

The "nail head like structure" of the contacts provides a small contact area with the semiconductor crystal, and a relatively large area to connect between the pads of different modules in a way that permits large alignment tolerances, and improves the Ohmic contact between pads. The electrical connection between the pads of different modules can be done by any suitable method, such as soldering, bonding, conductive gluing or pressing using soft metal bumps. Each of the anodes 760 is connected to a CSA 765 having an integration capacitor 770 and a bias resistor 775.

Cathode 715 is negatively biased at a voltage—V, to produce electrical field E1 and E2 in the volume of modules 705 and 710 respectively, as illustrated by the field lines in the FIG. 4. The field lines are very dense in the vicinity of the exposed areas 735, 755 of the contacts 730 and 750, due to their small area. A high density of field-lines is associated with a strong electrical field. When electron or hole clouds 575 and 580 (as shown in FIG. 3, but omitted in FIG. 4 for purposes of clarity) are collected by the contacts 730 and 750, they produce a non-equilibrium perturbation of the otherwise neutral electric charge on these contacts. In the area of contacts 730 and 750, this local charge perturbation becomes stronger, not only because of the reduced area of collection, but also under the influence of electrical fields E1 or E2, which themselves also become stronger in the vicinity of small contact areas 735 and 755. The combination of a strong local perturbation together with the influence of a strong electrical field, forces the injection of electrons and holes into the next module by stimulated injection. This stimulated injection assures free transition of charge carriers between adjacent modules to produce complete charge collection, even when the electrodes 730 and 750 have an energy barrier due to non-perfect Ohmic contact between them and the semiconductor crystal.

Figure 5:
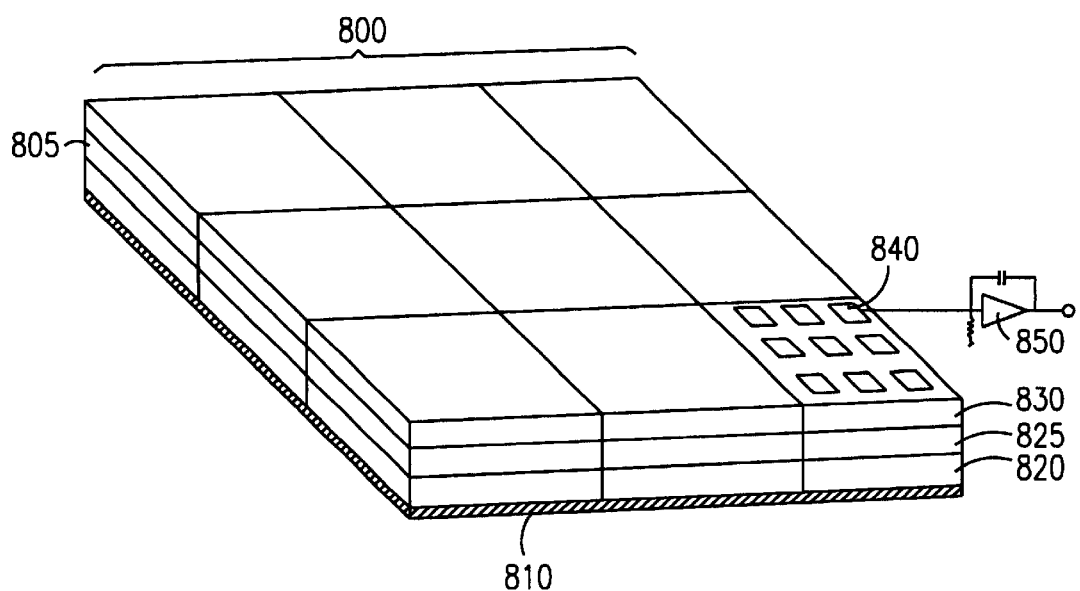
FIG. 5 shows a further preferred embodiment of the present invention, in which a number of individual detector stacks are joined together to produce a stacked detector array of larger area.

The above implementations of the present invention have been described in terms of a stack of single detector modules. The area of each individual module stack is limited by the maximum good area that can be economically diced from the semiconductor wafer raw material, as described in FIGS. 1(a) and 1(b). FIG. 5 shows a further preferred embodiment of the present invention, in which a number of individual detector stacks according to previously described embodiments of the present invention, are joined together to produce a stacked detector array of larger area. Such a large area array is need to for use in gamma-ray cameras capable of imaging sufficiently large areas of an object to provide useful diagnostic information in, for example, a medical imaging system.

The array 800 shown in FIG. 5 is composed of 9 separate detector stacks 805, mounted in a 3×3 square array on a common continuous cathode plane 810. Each detector stack is composed of three layers of individual detector modules 820, 825 and 830, on each of which are 9 stacked anode electrodes 840. A connection to a Charge Sensitive Amplifier 850 is shown for one cell stack in one module only, but it is to be understood that each stack has its own set of CSA's. Though the embodiment shown in FIG. 5 shows an array of only 9 individual detector stacks, it is to be understood that the number which can be incorporated in such an array can be made larger, in order to provide a larger imaging area.

It will be appreciated by persons skilled in the art that the present invention is not limited by what has been particularly shown and described hereinabove. Rather the scope of the present invention includes both combinations and sub-combinations of various features descried hereinabove as well as variations and modifications thereto which would occur to a person of skill in the art upon reading the above description and which are not in the prior art.

What is claimed is:

1. A gamma-ray detector device comprising:
   a plurality of two dimensional layers of semiconductor super positioned on each other, each layer of semiconductor having a first and second surface with electrodes making Ohmic contact with both of said surfaces; and
   wherein said electrode on at least second of said first and second surfaces of said first layer of semiconductor is pixelated, thereby forming a two dimensional array of detector cells on said first layer; and
   wherein said electrodes on both first and second surfaces of said other layers of semiconductor are pixelated, thereby forming two dimensional arrays of detector cells on said other layers; and
   wherein said other layers of semiconductor are superpositioned such that said pixelated electrodes thereon are substantially aligned with said pixelated electrodes on said second surface of said first layer of semiconductor; and
   wherein said substantially aligned pixelated electrodes on adjacent layers are in electrical contact, such that current can flow in both directions between said electrode on said first surface of said first layer of semiconductor, and between said substantially aligned pixelated electrode on said second surface of the last of said layers of semiconductor, through all superpositioned pixelated electrodes;
   said plurality of layers of semiconductor being of total thickness sufficient to effectively absorb gamma-ray photons having energies typical of those arising from electron-positron annihilation events.

2. A gamma-ray detector device according to claim 1 and wherein said photons have energies typically less than those arising from electron-positron annihilation events.

3. A gamma-ray detector device according to claim 2 and wherein said total thickness is at least 5 mm.

4. A gamma-ray detector device according to claim 1 and also comprising a device for measuring current, connected to at least one of said substantially aligned pixelated electrodes on said second surface of said last layer of semiconductor, operative to measure current flowing between said at least one pixelated electrode and said electrode on said first surface of said first layer of semiconductor.

5. A gamma-ray detector device according to claim 4 and wherein said device for measuring current is a circuit comprising a charge sensitive amplifier.

6. A gamma-ray detector device according to claim 1 and wherein said electrode on-said first surface of said first layer of semiconductor has a voltage applied thereto, of polarity such that it acts as a cathode relative to said pixelated electrodes on said second surface of said last layer of semiconductor.

7. A gamma-ray detector device according to claim 1 and wherein said electrode on said first surface of said first layer of semiconductor has a voltage applied thereto, of polarity such that it acts as an anode relative to aid pixelated electrodes on said second surface of said last layer of semiconductor.

8. A gamma-ray detector array comprising a two dimensional array of gamma-ray detector devices according to claim 1.

9. A gamma-ray detector device according to claim 1, and wherein an insulating layer is formed between said surface of said layer of semiconductor and said pixelated electrodes, said insulating layer having a periodic array of openings, such that said pixelated electrodes contact said layer of semiconductor only through said openings, the size of side openings being significantly smaller than the size of said pixelated electrodes.

10. A gamma-ray detector device according to claim 9 and wherein said openings are located relative to said pixelated electrodes such that said openings fall in the vicinity of the enter of said pixelated electrodes.

11. A gamma-ray detector device according to claim 1 and wherein said total thickness is at least 10 mm.

12. A gamma-ray detector device according to claim 1 and wherein the relative thicknesses of said layers of semiconductor and said electrodes are such that gamma ray photons are absorbed essentially only in said layers of semiconductor.

13. A gamma-ray detector device according to claim 1 and wherein said semiconductor is cadmium telluride.

14. A gamma-ray detector device according to claim 1 and wherein said semiconductor is cadmium zinc telluride.

15. A gamma-ray detector device comprising:
    a plurality of two dimensional layers of semiconductor superpositioned on each other, each layer of semiconductor having a first and second surface with electrodes on said surfaces; and
    wherein said electrode on at least second of said first and second surfaces of said first layer of semiconductor is pixelated, thereby forming a two dimensional array of detector cells on said first layer; and
    wherein said electrodes on both first and second surfaces of said other layers of semiconductor are pixelated, thereby forming two dimensional arrays of detector cells on said other layers; and
    wherein said other layers of semiconductors are superpositioned such that said pixelated electrodes thereon are substantially aligned with said pixelated electrodes on said second surface of said first layer of semiconductor; and
    wherein said substantially aligned pixelated electrodes on adjacent layers are in electrical contact, such that current can flow between said electrode on said first surface of said first layer of semiconductor, and between said substantially aligned pixelated electrode on said second surface of the last of said layers of semiconductor, through all superpositioned pixelated electrodes; and wherein an insulating layer is formed between said surface of said layer of semiconductor and said pixelated electrodes, said insulating layer having a periodic array of openings, such that said pixelated electrodes contact said layer of semiconductor only through said openings, the size of said openings being significantly smaller than the size of said pixelated electrodes.

16. A gamma-ray detector device according to claim 15 and wherein said size of said openings is such that said current flow within said semiconductor layers is concentrated around said openings.

17. A gamma-ray detector device according to claim 15 and wherein said openings are located relative to said pixelated electrodes such that said openings fall in the vicinity of the center of said pixelated electrodes.

* * * * *